(No Model.) 2 Sheets—Sheet 1.
T. B. HOWE.
BOTTLE FORMING MACHINE.
No. 447,452. Patented Mar. 3, 1891.
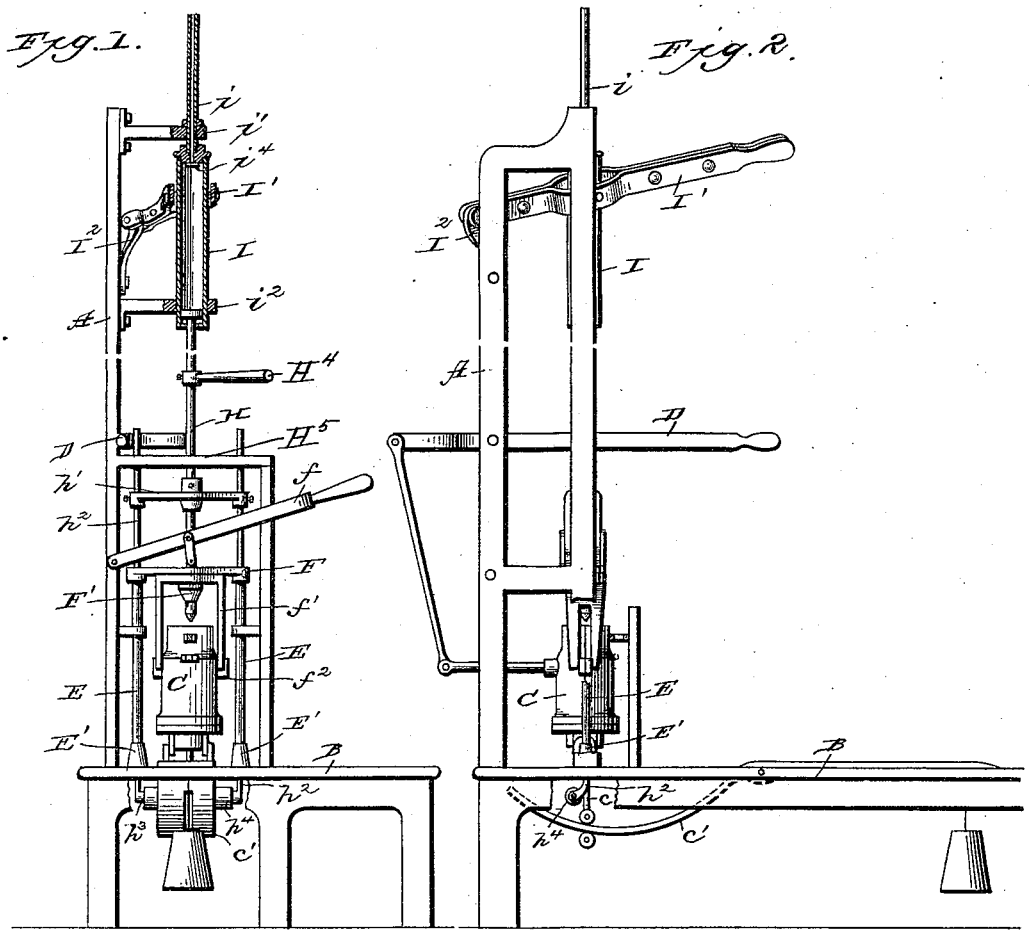
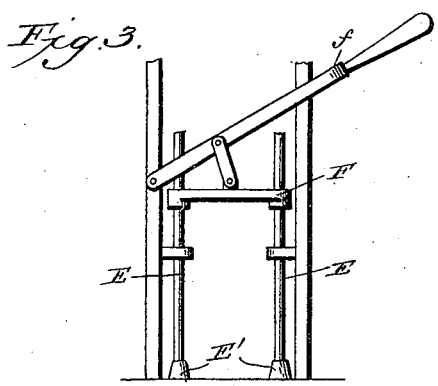
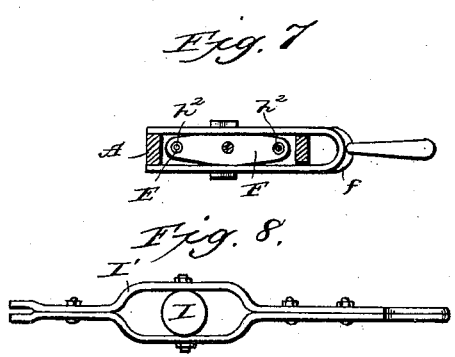
Witnesses
Thomas Durant.
Alex J. Stewart.
Inventor
Thomas B. Howe.
By his Attorneys
Church & Church

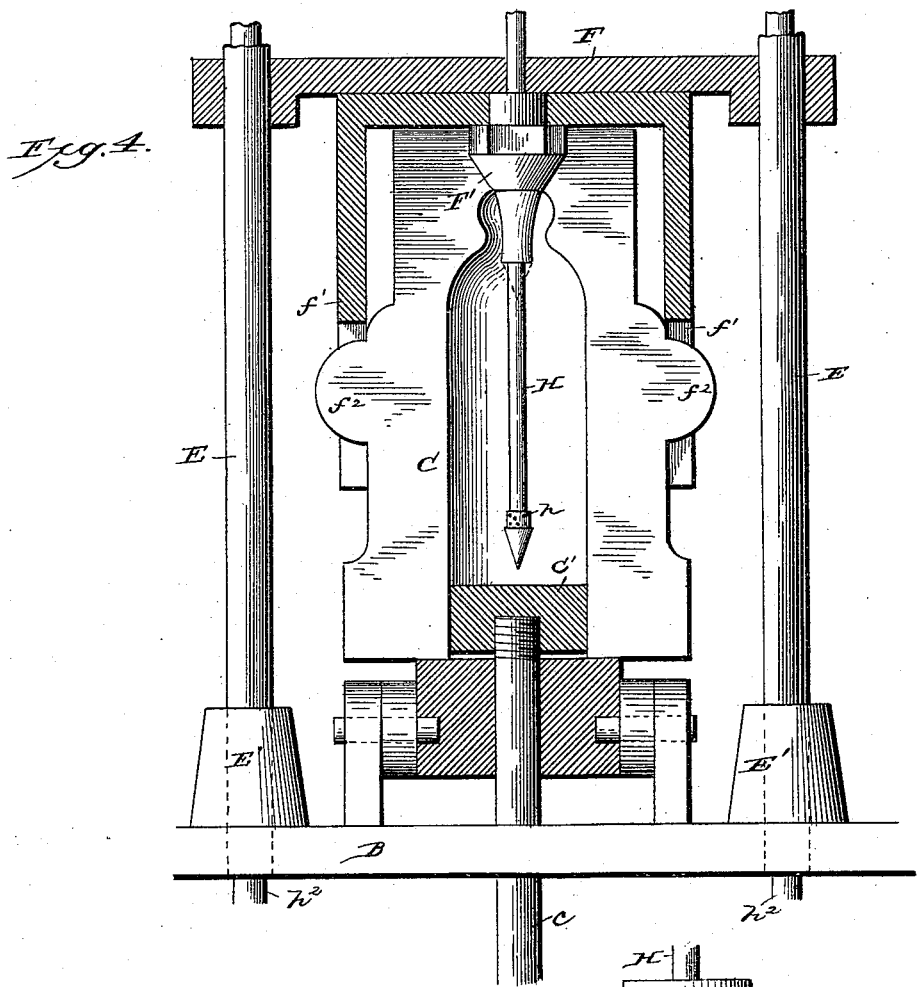

UNITED STATES PATENT OFFICE.

THOMAS B. HOWE, OF SCRANTON, PENNSYLVANIA.

BOTTLE-FORMING MACHINE.

SPECIFICATION forming part of Letters Patent No. 447,452, dated March 3, 1891.

Application filed July 8, 1890. Serial No. 358,117. (No model.)

*To all whom it may concern:*

Be it known that I, THOMAS B. HOWE, of Scranton, in the county of Lackawanna and State of Pennsylvania, have invented certain new and useful Improvements in Bottle-Forming Machines; and I do hereby declare the following to be a full, clear, and exact description of the same, reference being had to the accompanying drawings, forming a part of this description, and to the letters of reference marked thereon.

This invention relates to improvements in machines for forming bottles and similar hollow articles from glass, such, for instance as described in my prior application, Serial No. 351,780, filed May 14, 1890, and has for its object to improve the construction and operation of the machine, whereby the efficiency of the parts is increased, enabling the bottles to be formed more accurately and rapidly than heretofore, the independent air-pressure supply dispensed with, and the stopping up of the aperture or apertures in the air-pipe prevented.

The invention consists in certain novel details of construction and combinations and arrangements of parts to be hereinafter described, and pointed out particularly in the claims at the end of this specification.

Referring to the accompanying drawings, Figure 1 is a front elevation, partly in section, of a machine constructed in accordance with my present invention. Fig. 2 is a similar view looking at the side. Fig. 3 is an elevation of the mold-clamping and neck-forming mechanism. Fig. 4 is an enlarged section through the mold, air-supply tubes, plunger, and connected parts. Fig. 5 is an enlarged view, partly in section, of the plunger and air-supply tube. Fig. 6 is a detail section of a modified form of plunger and air-tube point. Fig. 7 is a top plan view of the cross-piece carrying the plunger and lever for operating the same, and Fig. 8 a top plan view of the pressure-cylinder and lever for operating the same.

Similar letters of reference in the several figures indicate the same parts.

In general construction of frame-work and operative parts the present machine resembles closely the one shown in my prior application before referred to, and to which reference is hereby made for a more full description of such general features.

A indicates the main frame; B, the base; C, the mold made in three parts and controlled by the lever D, so as to be opened and closed.

C' indicates the piston working in and forming the bottom of the mold; $c$, the rod extending down from the same, and $c'$ the foot-lever for elevating the piston at the proper moment. At each side of the mold are tubes E E, held firmly in brackets E' E', and on the upper ends of these tubes is mounted a cross-piece F, so as to slide freely thereon toward and from the mouth of the mold. Secured rigidly to this cross-piece is the plunger F', which, when the cross-piece is brought down, fits within the mouth of the mold and presses the upper end of the bottle into shape. The cross-piece is operated by means of a handle $f$, and on the under side is provided with downwardly-extending arms or projections $f'$, which pass on each side of lugs $f^2$, located on opposite halves of the mold, whereby when the plunger is depressed even to a very slight extent the halves of the mold are held firmly together, as will be readily understood from an inspection of Figs. 2 and 4.

Working through the plunger is the air-pressure-supply tube H, having the exit-openings $h$ so located as to be covered by the walls of the lower end of the plunger when the air-tube is elevated, but to be uncovered the moment the same is depressed. The end of the air-tube is pointed, so as to pass easily and smoothly into the glass, and it is guided by the cross-piece $h'$, the ends of which are securely fastened to upright rods $h^2$, working through guides in the frame at the top and passing down through the tubes E and united below the base by a rod $h^3$, having a roller $h^4$ journaled thereon for a purpose which will presently appear.

At the top of the frame is mounted a movable cylinder or air-compressing chamber I, preferably guided at the upper end by the tube $i$, secured thereto and passing through a guide $i'$ in the frame-work, and at the lower end by a guide $i^2$, surrounding the cylinder, the cylinder being controlled and moved up and down by means of a handle I', connected to the frame by a link $I^2$, so as to have a wide range of movement in a straight line.

The upper end of the air-supply tube H passes up into the cylinder I and is provided with a piston fitting air-tight therein, the end of the tube, however, being left open within the cylinder. Now it will be seen that when a valve $i^4$ is provided for preventing the escape of air from the cylinder through the tube $i$, but permitting air to enter through the tube, it is only necessary to depress the cylinder in order to create an air-pressure therein which tends first to depress the air-supply tube and then to pass out of the end of the same into the bottle or article in the mold. The rods $h^2$ are curved rearward a slight distance below the base, so as to be out of the way of the piston-rod, and the roller is, when the air-supply tube is depressed, adapted to rest on the foot-lever $c'$.

The operation of the machine as thus far described will be readily understood. Starting with the mold empty when the parts occupy the position shown in Fig. 1, the operator first opens the mold by means of the handle D, the glass is poured in, the mold closed, and the plunger depressed by the handle $f$, the initial movement in this direction causing the arms $f'$ to embrace the lugs $f^2$ and lock the halves of the mold firmly together, further movement of the handle seating the plunger firmly within the mouth of the mold. The foot-lever is now operated to elevate the piston and drive the glass to the top of the mold, so as to shape the mouth of the bottle, at which movement it will be noted that the air-supply tube and roller $h^4$ have been depressed by the plunger until the roller is at a point where the foot-lever stops, so as to come in contact therewith, and the point of the air-tube is just as far from the piston as is necessary for the thickness of the glass in the bottom of the bottle. The handle I' is now depressed, causing the cylinder to move downward and the air within the same to be compressed until sufficient power is stored to start the downward movement of the air-supply tube and the discharge of air therefrom within the mold. As the air-supply tube descends, it carries with it, of course, the rods $h^2$ and roller $h^4$, the latter in turn engaging the foot-lever and causing the same to draw the piston down just as fast as the air-supply tube descends, thereby preserving the proper thickness of material at the bottom of the mold and also regulating the supply of air to a nicety. The degree of pressure and rate of movement are, it will be seen, made to conform to the requirements of each separate charge of molten glass, the requirements of each charge, it is found, varying somewhat by reason of the difference in temperature of the same. While under ordinary conditions the volume of air compressed by a single movement of the cylinder is sufficient to give the required degree of pressure to expand the molten glass throughout every part of the mold, I do not wish to be confined to this method of operation, as the air-supply tube may be provided with a handle $H^4$, with which the operator may hold the tube depressed with one hand, and with the other hand operate the lever I' of the cylinder rapidly up and down until the required volume of air is forced into the mold, any ordinary arrangement of valves for the entrance and exit apertures to the cylinder being employed when found desirable or necessary.

The preferred form of plunger and air-supply-tube point is shown in Fig. 5, in which it will be seen that the plunger is conical at the top and the lower portion shaped to fit within and form accurately the bottle-mouth, and the air-supply tube working through the plunger has an enlarged point or end, above which the exit-apertures are located. When the tube is elevated, these apertures pass up within the plunger, and the entrance of glass or other foreign matter is prevented.

By making the head of the air-pressure-supply tube larger than the portion which passes through the plunger down into the bottle it will be seen that as the point descends but a very narrow surface of metal comes in contact with the glass, and a clear air space or cavity is left all around the tube clear up to the end of the plunger, enabling the pressure of the air to be evenly applied throughout the whole length of the bottle until a complete cavity is formed, and the chilling of the glass by contact with the cooler metal is entirely obviated.

It is obvious that the shape of the plunger and point may be changed very materially while preserving the gist of the idea, which consists in keeping the exit-apertures closed while the point is forcing its way into the body of the glass. The construction shown in Fig. 6, for instance, may be substituted, in which it will be seen that the apertures, instead of being located above the point, are located within the point, but close to the central stem or tube, and are adapted to be closed and protected by the end face of the plunger, the air issuing from the apertures in this instance being directly upward instead of outward.

The hub of the hand-lever $H^4$ constitutes an adjustable stop for gaging the downward movement of the piston-bottom and air-supply tube by coming in contact with the frame through which the tube passes at $H^5$, and by adjusting this stop the distance the point of the tube and piston-bottom shall descend may be regulated, rendering it possible to form bottles of different size with the same mold, and as a further adjustment the cross-head carrying the rods $h^2$ may be adjustably connected thereto, if desired.

Having thus described my invention, what I claim as new is—

1. In a bottle-forming machine, the combination, with the mold and the air-supply tube passing within the mold, of the cylinder communicating with said tube and the handle for depressing the cylinder and forcing its contained air through the tube, substantially as described.

2. In a bottle-forming machine, the combination, with the mold and vertically-movable air-pressure-supply tube, of the air-chamber at the upper end of the tube and the handle for simultaneously depressing the tube and compressing the air within the chamber, substantially as described.

3. In a bottle-forming machine, the combination, with the mold and the vertically-movable air-pressure-supply tubes having the piston at the upper end, of the vertically-movable cylinder surrounding said piston and the handle for depressing said cylinder to compress the air within the same, substantially as described.

4. In a bottle-forming machine, the combination, with the mold, the vertically-movable air-pressure-supply tube having the piston at the upper end, and the handle thereon for holding the same depressed, of the vertically-movable cylinder surrounding said piston and the handle for depressing said cylinder to compress the air within the same, substantially as described.

5. In a bottle-forming machine, the combination, with the divided mold, of the vertically-movable plunger having the downward extensions embracing the sections of mold to hold the same closed and the air-pressure-supply tube passing through the plunger, substantially as described.

6. In a bottle-forming machine, the combination, with the mold formed in halves hinged together at the bottom, of the vertically-movable plunger fitting within the mouth of the mold, the downward extensions on the plunger embracing the halves of said molds when depressed, and the vertically-movable air-pressure-supply tube working through said plunger, substantially as described.

7. In a bottle-forming machine, the combination, with the mold formed in halves hinged together at the bottom, said halves having abutting lugs, of the vertically-movable plunger having the bifurcated downward extensions embracing said lugs and the air-pressure-supply tube passing through the plunger, substantially as described.

8. In a bottle-forming machine, the combination, with the mold and the piston working within and forming the bottom of the same, of the vertically-movable air-pressure-supply tube and the rods moved by the tube for depressing the piston as the tube is depressed, substantially as described.

9. In a bottle-forming machine, the combination, with the mold and the piston working within and forming the bottom of the same, of the vertically-movable plunger for closing the mouth of the mold, the air-pressure-supply tube working through said plunger, and the rods moved by the air-pressure-supply tube for depressing the piston, substantially as described.

10. In a bottle-forming machine, the combination, with the mold, the piston working within and forming the bottom of the same, and the lever for elevating said piston, of the vertically-movable plunger fitting within the mouth of the mold, the tubes on which said plunger is mounted, the vertically-movable air-pressure-supply tube mounted on rods passing through the tubes which carry the plunger, and the cross-piece or roller at the bottom of said rods adapted to engage the foot-lever to depress the piston, substantially as described.

11. In a bottle-forming machine, the combination, with the mold and the tubular plunger for fitting within the mouth of the same, of the air-pressure-supply tube having the closed end and the exit-apertures above the end, adapted to be closed by the plunger, substantially as described.

12. In a bottle-forming machine, the combination, with the mold and the tubular plunger fitting within the same to form the mouth of the bottle, of the air-pressure-supply tube having the enlarged end below the plunger and the exit-apertures above said head, substantially as described.

13. An air-pressure-supply tube for bottle-forming machines, having an enlarged end with the exit-apertures for the air above said enlargement, substantially as described.

14. An air-pressure-supply tube for bottle-forming machines, having the sharpened and enlarged end and the exit-apertures for the air above the same, substantially as described.

15. In a bottle-forming machine, the combination, with the mold and plunger fitting within the mouth of the same, of the air-pressure-supply tube working through said plunger and having the end below the same of substantially the same diameter as the end of the plunger, substantially as described.

16. In a bottle-forming machine, the combination, with the mold, of the piston working within and forming the bottom of the mold and an adjustable stop for gaging the downward movement of the piston, whereby different-sized bottles may be formed in the mold, substantially as described.

17. In a bottle-forming machine, the combination, with the mold and the piston working within and forming the bottom of the mold, of the rods for depressing the piston, having the adjustable stop for gaging the downward movement of the piston, whereby different-sized bottles may be formed in the same mold, substantially as described.

18. In a bottle-forming machine, the combination, with the mold and the piston working within and forming the bottom of the mold, of the movable air-supply tube, the adjustable stop on said tube, and the rods connected to the tube for depressing the piston in unison with the air-supply tube, substantially as described.

THOMAS B. HOWE.

Witnesses:
 ALEX. S. STEUART,
 J. B. CHURCH.